United States Patent [19]
Kaeppler et al.

[11] 3,788,046
[45] Jan. 29, 1974

[54] APPARATUS FOR FILTERING GASES HAVING A MOVABLE FILTER BAG UNIT

[75] Inventors: Gerhard Kaeppler, Cologne-Heimersdorf; Stefan Ficker, Urberach; Wilfried Werner Pergande, Cologne-Brueck, all of Germany

[73] Assignee: The Slick Corporation, New York, N.Y.

[22] Filed: Dec. 2, 1971

[21] Appl. No.: 203,968

[30] Foreign Application Priority Data
Dec. 17, 1970 Germany.................. P 20 62 152.7

[52] U.S. Cl....................... 55/341, 55/481, 55/490, 55/502
[51] Int. Cl............................................. B01d 46/02
[58] Field of Search. 55/96, 97, 341, 356, 357, 481, 55/490, 502; 210/332

[56] References Cited
UNITED STATES PATENTS
| | | | |
|---|---|---|---|
| 3,063,224 | 11/1962 | Getzin | 55/493 |
| 3,362,138 | 1/1968 | Acker | 55/341 |
| 3,486,310 | 12/1969 | Nilsson | 55/304 |

Primary Examiner—Bernard Nozick

[57] ABSTRACT

Filter apparatus for the separation of gas from suspended solid particles by filter bags including a housing with a filter chamber therein. The filter chamber includes a first chamber into which particle laden gas is introduced and a second chamber from which cleaned gas is withdrawn after suspended solid particles have been removed by the filter bags. Advantageously a filter bag unit is constructed so that it is movable in and out of the filter chamber for convenient inspection, cleaning and repair. The movable unit includes a gas impermeable filter bag support sheet forming a dividing wall between the first and second chambers. The support sheet has a plurality of passages with filter bags mounted thereon adjacent to passages and extending into the first chamber. A frame supports the sheets with the free ends of the filter bags extending downwardly therefrom. A releasably sealing device on the housing aligned with the support sheet securely holds the filter bag unit in the chamber and provides an airtight seal for the support sheet between the first and second chambers.

1 Claim, 6 Drawing Figures

3,788,046

APPARATUS FOR FILTERING GASES HAVING A MOVABLE FILTER BAG UNIT

BACKGROUND OF THE INVENTION

The present invention relates to apparatus for separating gas from suspended solid particles and more particularly to filtering apparatus having a filter bag unit that is readily movable out of the filter chamber for convenient inspection, cleaning and repair.

These filtering devices function to free particle-laden gases from their dust burdens with the filtering attained by forcing particle-laden gas through a filtering medium of either natural or synthetic material such as felt, metallic meshes, or through metal felts. All particles larger than the size of the pores of the filtering medium remain adhered to the surface of the filtering medium while the particles that are smaller than the pores of the filter medium tend to infiltrate into the pores.

It is necessary to clean the filtering medium after a certain period of operation as the dust particles clogg up the pores to such an extent that the filtering operation is either impaired or else ceases completely. The cleaning process occurring during the filtering operation may be carried out by means of beating or vibrating devices, by pneumatic air impacts in the case of modern installations which expand the walls of the filtering medium for a short period, expel the dust and blow the pores clear. Apart from these intervals which are phased into the actual filtering process there arises the frequent necessity for examining the filtering medium as a faulty filtering hose which has been insufficiently cleaned can readily cause the filtering operation to be greatly impaired. The examination referred to usually entails the dismantling of the interior of the filtering installation which is undesirable not only because the work involved has to take place in dust-filled air but also because the restricted space makes the dismantling a time-consuming operation. Operation of filtering installations with different types of particle laden gas demands continuous dismantling and installing. The installation must be often cleaned in such cases when a different type of dust is to be filtered, a time-consuming and laborious process.

In order to facilitate the exchange of filtering bags or hoses so-called "high speed closures" have been introduced. But even with such devices the work has still to be performed in the interior of the filtering chamber and one filtering hose after the other has to be separately disengaged or fastened.

SUMMARY OF THE INVENTION

It is the object of this invention to overcome the disadvantages of previous filtering devices by making it possible to remove and replace the filters in a quick and convenient operation. In particular, this invention facilitates the inspection, cleaning and changing of the filter elements, in the form of hoses, pockets or bags, by providing an advantageously convenient apparatus which allows the filter elements which are fastened to a releasable and movable support sheet or dividing wall to be taken completely or partly from the filter chamber by the actuation of a release mechanism. The support sheet with attached filter bags are mounted on a frame forming an integral filter bag unit which can be conveniently removed from the filter chamber for inspection, cleaning and repair.

The quantities of dust to be removed during the course of the filtering operation have increased to such an extent that several groups of dust-removal devices with separate filter chambers are frequently necessary, each requiring a separate removable filter bag unit. The movable filter bag unit frequently must be moved in a confined space so that the frame of the movable unit must be shifted laterally from filter chamber to filter chamber. Filter chambers may also differ in height so that a frame of uniform height cannot be employed for all movable filter units. Accordingly, this invention also has the object of locating the detachable movable filter bag unit on a transportable frame having a lifting mechanism to lift the filter bag support sheet into position in the filter chamber.

DESCRIPTION OF THE DRAWINGS

Various other objects and advantages of this invention will be apparent from the following detailed description, the claims and the drawings appended thereto wherein:

Figure 1:
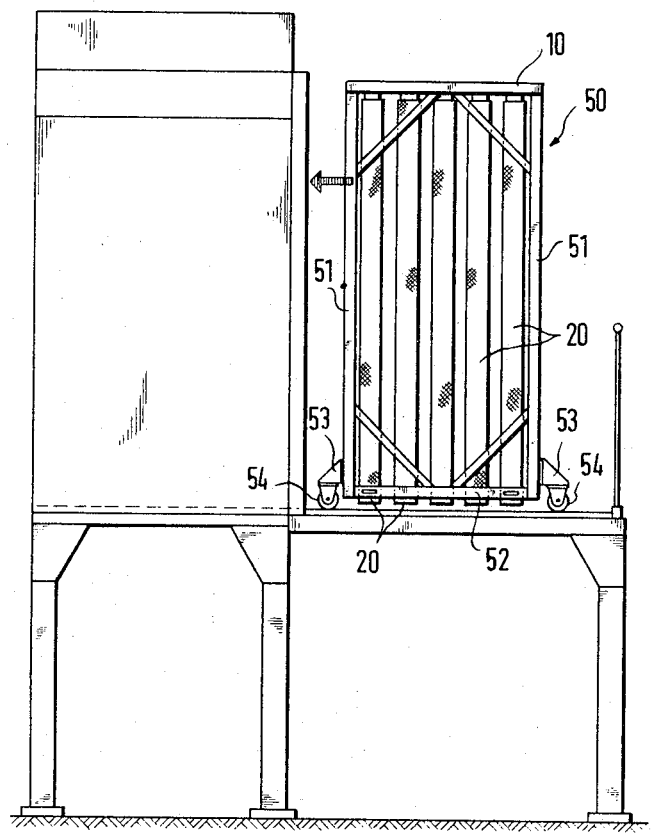
FIG. 1 is a side elevation view of the filtering apparatus of this invention having a housing with a movable filter bag unit disposed on a platform outside the filter chamber of the housing.
Figure 2:
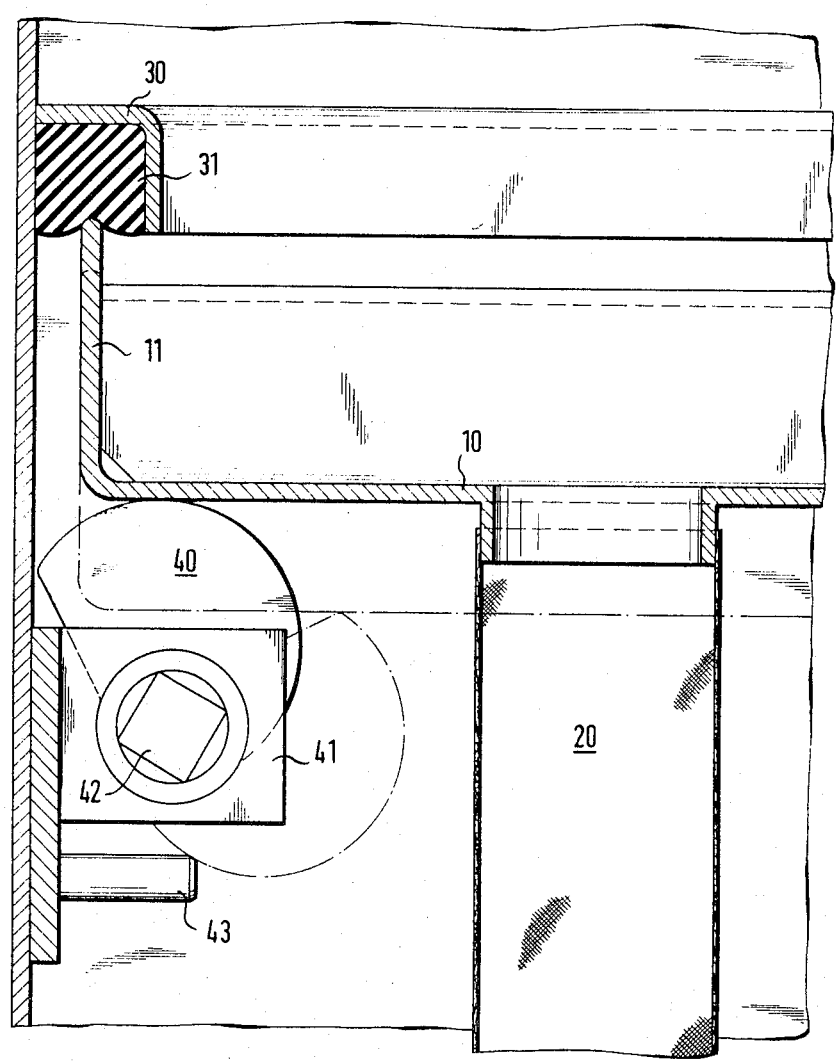
FIG. 2 is a partial cross sectional view to an enlarged scale illustrating the sealing of the filter bag support sheet of the filter bag unit in the filtering chamber of the housing.
Figure 3:
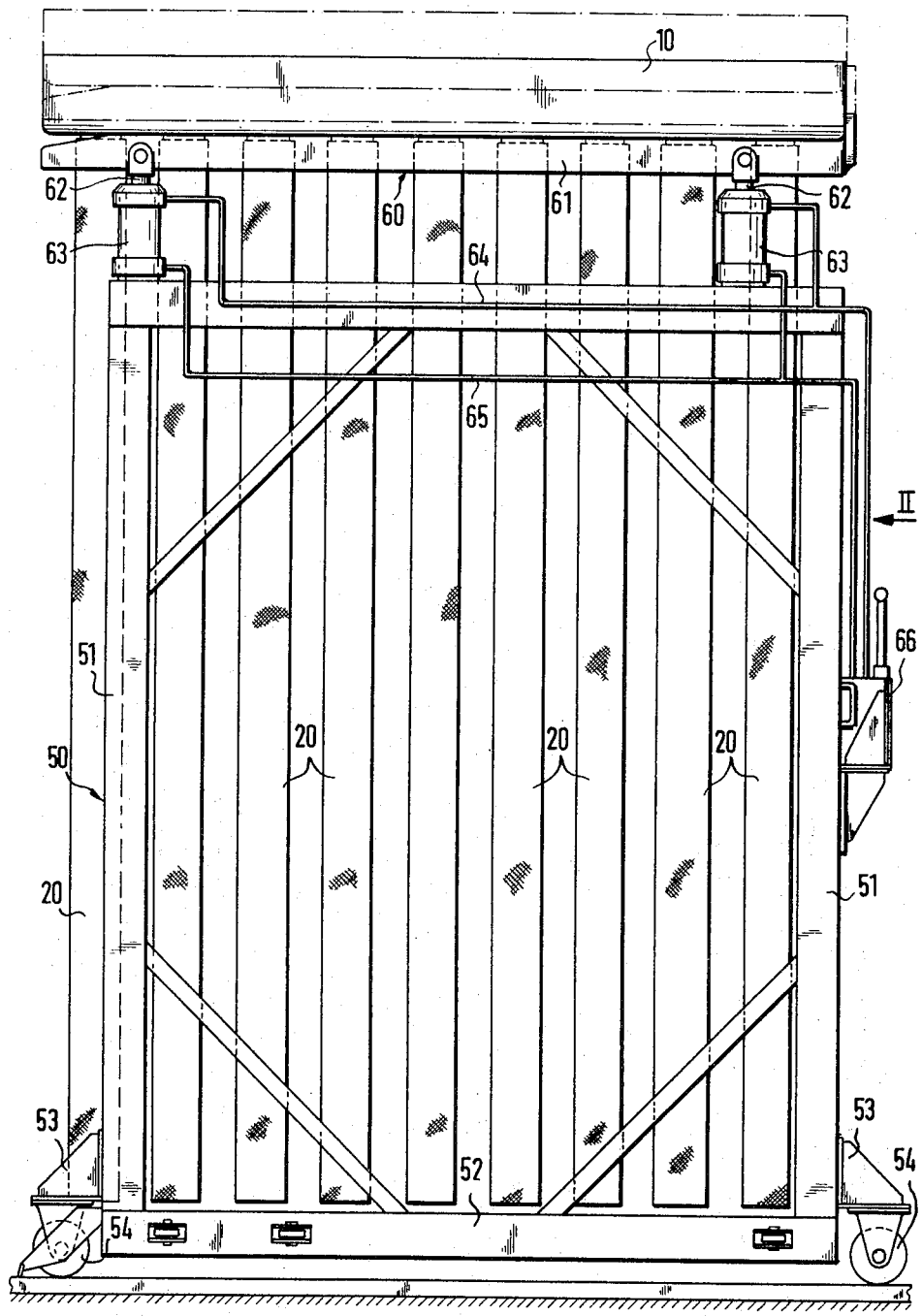
FIG. 3 is an enlarged side view of the movable filter bag unit shown in FIGS. 1 and 2 with the addition of a lifting mechanism on the frame illustrated in the lower or open position.
Figure 4:
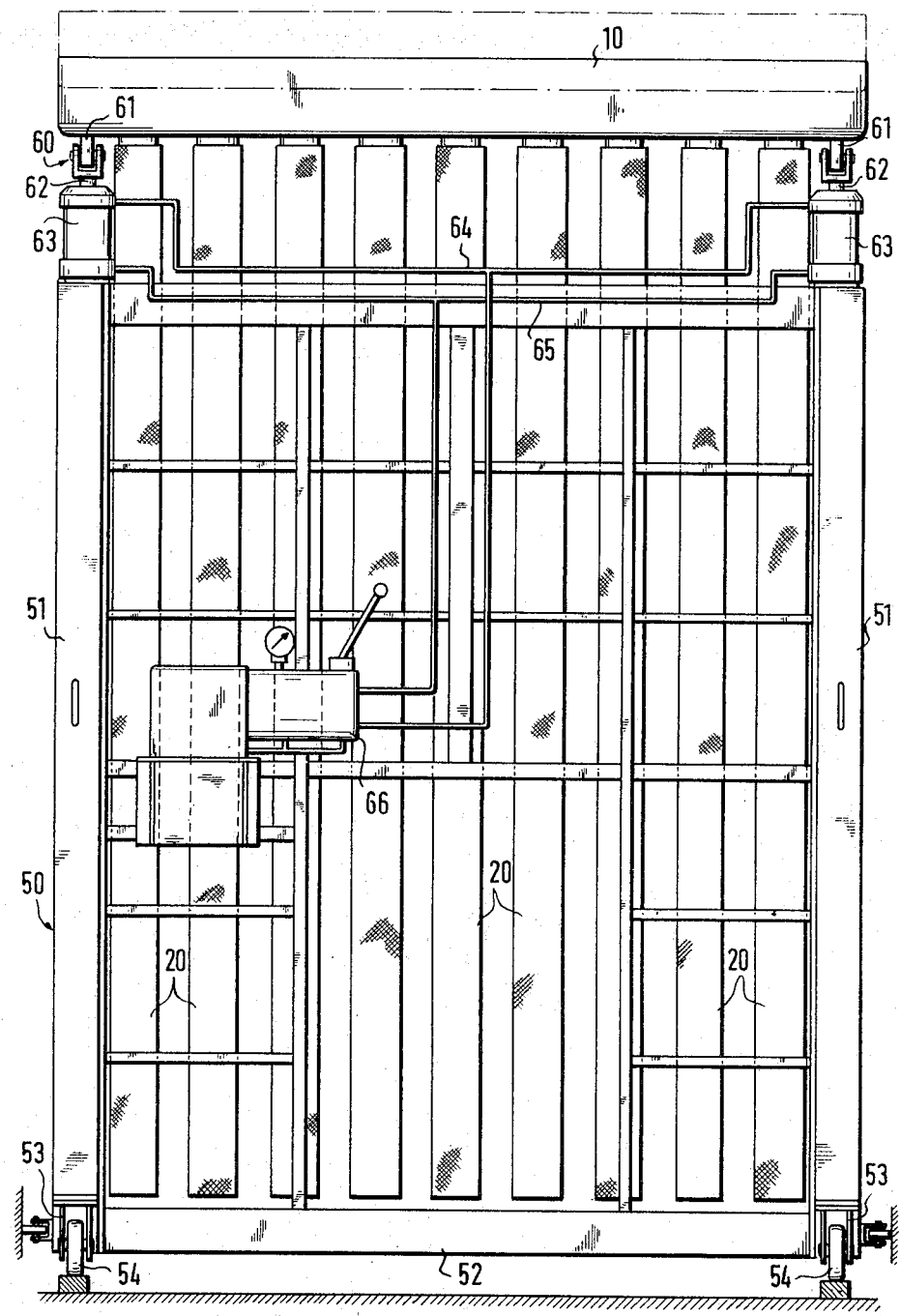
FIG. 4 is a front view of the movable filter bag unit viewed in the direction of arrow II of FIG. 3.

Referring now in detail to the drawings, there is illustrated in FIGS. 1 and 2, a device for filtering dust particles which consists of a housing with a filtering chamber into which the dust-laden air is led and out of which dust-freed air is expelled.

The filtering chamber of the housing is subdivided by means of a dividing wall or filter bag support sheet 10 into an upper and lower plenum. In the usual manner particle laden gas is introduced into the lower plenum, the gas is filtered, and cleaned gas flows from the upper plenum. The support sheet 10 is advantageously adapted to be releasably secured in the filtering chamber of the housing with the lower plenum on the under side of the support sheet 10 as viewed in FIG. 2. The upper plenum is located on the top side of the support sheet 10 and receives cleaned gas after it has passed from the lower plenum through the filter hoses or bags 20 and through the apertures in the support sheet 10 adjacent the upper ends of the filter bags 20. The filter bags 20 are fastened to the support sheet 10 so that their open interiors communicate with the upper plenum through the apertures in the support sheet.

As illustrated in FIG. 1, the support sheet 10 is mounted on a frame 50 having vertical struts 51 and base struts 50 which surround the collection of filter bags 20 in a framelike manner. Vertical struts 51 are of sufficient length to permit the suspension of the filter bags 20 in the frame 50 without their touching the base. Bearing brackets 53 with attached rollers 54 are mounted on the frame 50 for an easy insertion and removal of the movable filter bag unit into the filter chamber. Previously the filter bag support sheet was fixedly mounted in the filter chamber but is now in the form of a highly desirable movable unit which carries and supports the filter bags 20 for convenient inspection and repair.

The filter bag support sheet 10 has a peripheral, upwardly extending flange 11 which is adapted to engage an aligned sealing surface consisting of a bent angularly shaped shoulder section 30 which extends around the interior wall of the housing of the filter chamber between the upper and lower plenum. The shoulder section 30 contains an attached sealing strip 31 of moulded resilient material which similarly extends around the wall of the filter chamber. FIG. 2 illustrates the operational condition in which the sheet flange 11 is pressed into the closed position into engagement with the sealing strip 31.

In order to position the support sheet 10 in the open or closed position, a pair of eccentric rods 40 are rotatably mounted in bearing brackets 41 attached on opposite sides of the filter chamber longitudinal wall beneath the sheet 10. The eccentric rods 40 can be turned into the upper or closed position by means of a handle connection 42, as illustrated in solid line in FIG. 2, so that support sheet 10 with its peripheral flange 11 is pressed firmly into engagement with the aligned sealing strip 31.

When the eccentric rod 40 is turned by its handle to the lower or open position illustrated in phantom line in FIG. 2, where it is arrested by a stop pin 43, the support sheet 10 is then released from the sealing strip 31 so that the movable filter hose unit may be removed wholly or partially, from the filter chamber together with the filter bags 20 attached thereto. The unit may be pulled out a relatively short distance sufficient for a preliminary inspection or completely out for cleaning and repair.

An additional advantage is provided by the eccentric rods 40 which when in the lower or open position form a guide or slide path under the support sheet 10 for moving the unit out of the filter chamber. The rods 40 are fitted with a coating or lining to aid the sliding of the unit in cooperation with rollers 54 or some similar means in order to facilitate the extraction of the movable filter hose unit from the filter chamber.

Another embodiment of this invention is illustrated in FIGS. 3–6 which show a device similar to the filtering device illustrated in FIGS. 1 and 2, with like parts having the same reference numerals but differs in that it is provided with a filter bag support sheet lifting mechanism 60 mounted on the upper portion of the frame 50.

The filter bag support sheet lifting mechanism 60 consists of two spaced lifting bars 61 disposed under the hose sheet 10 and on opposite sides thereof. The bars 61 are attached to movable lifting rods 62 extending from hydraulic cylinders 63. Hydraulic ducts 64 and 65 lead from the lifting cylinders 63 to a control switch and hydraulic pumping device 66. The support sheet lifting mechanism 60 can also be moved up and down by means of toothed racks or similar devices.

Figure 5:
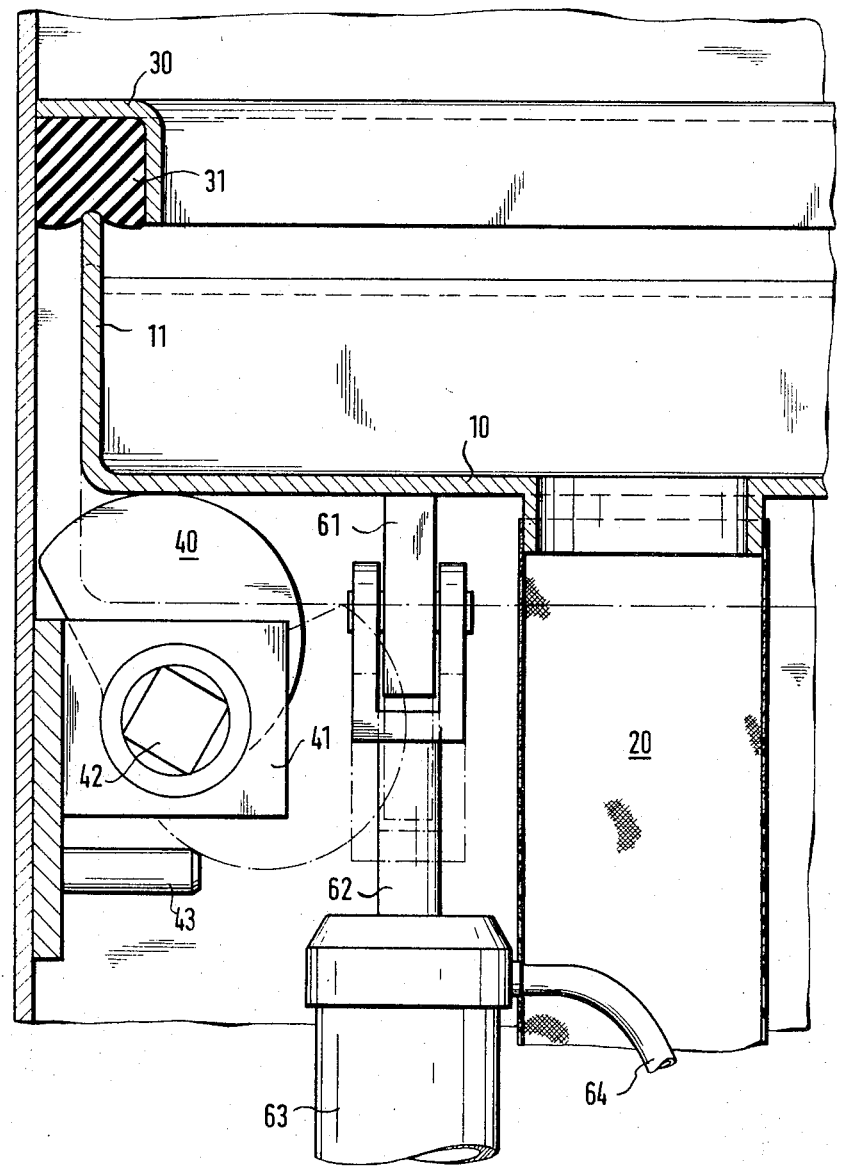
FIG. 5 is a view similar to FIG. 2 with the addition of the lifting mechanism shown in FIGS. 3 and 4.

FIG. 5 illustrates certain details of the operation of the lifting mechanism 60 in cooperation with the eccentric rods 40 and shows the upper or closed position in solid line and the open or lower position in phantom line. When the support sheet 10 with the filter bags 20 attached rests on the lifting bars 61 in the lowered position the unit can readily be moved into the filter chamber and pressed into the upper sealing or closed position by the lifting mechanism 60 and be locked in this position by the eccentric rods 40. When the rods 62 are again lowered, the filter unit can conveniently be moved out of the filter chamber.

Figure 6:
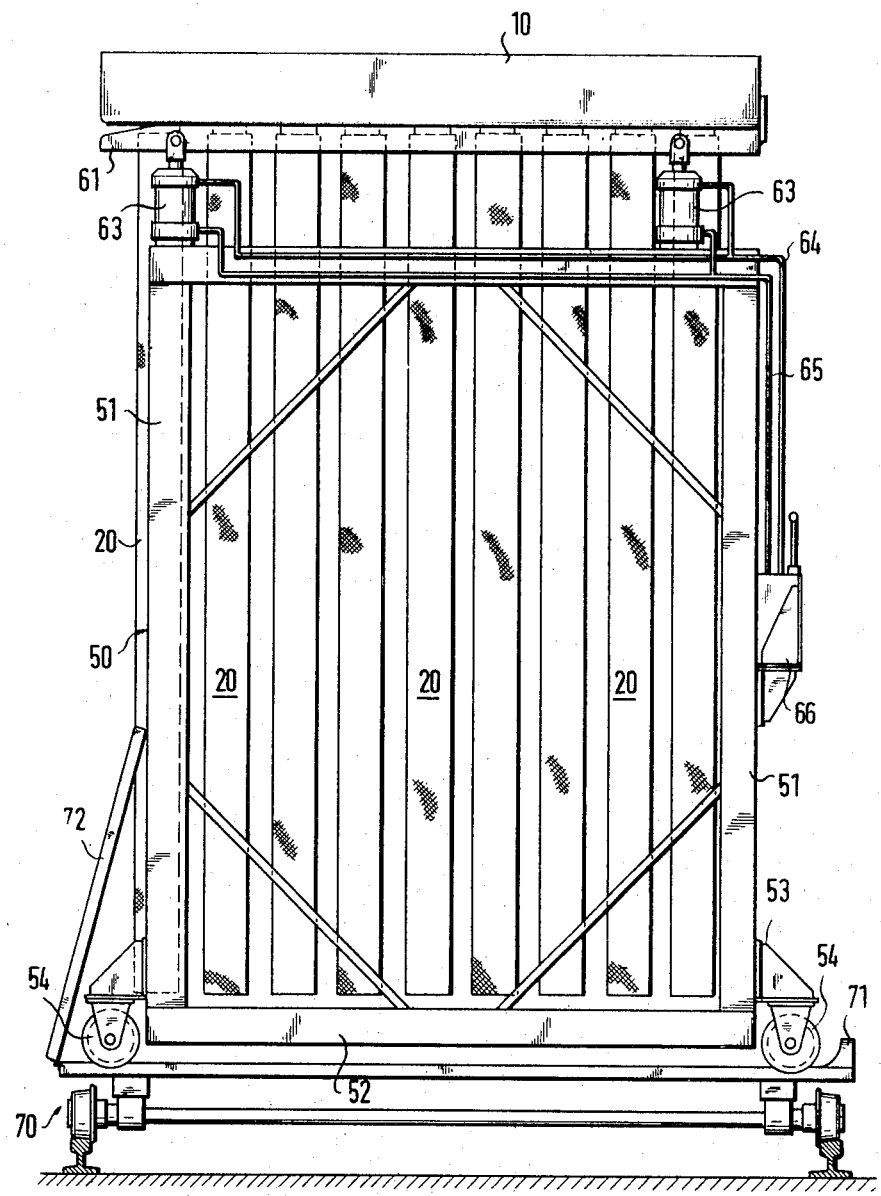
FIG. 6 is a view similar to FIG. 3 with the addition of a movable car and hinged platform for transport of the unit in a direction normal to its movement out of the filter chamber.

A car 70 movable in the normal transport direction as shown in FIG. 6 is provided for transporting the filter bag unit after it has been removed from the filter chamber. The car 70 is arranged to move on rails and is equipped with a ramp or hinged platform on its upper side 71 on to which the frame 50 can be driven. The front portion 72 of the platform can be let down and thus form an ascent ramp for the frame 50. The unit can thus be employed interchangeably for groups of filtering devices. The filter chamber may be constructed in such a way that several filter bag units with individual support sheets 10 and frames 50 are arranged to be individually transportable and movable.

This invention provides an advantageous economical construction for filtering devices that allows for convenient checking of filter bags, cleaning and repair from outside the filter chambers in a time and labor saving manner and avoids the disadvantages of time loss and hazards to health inherent in cleaning and repair in the relatively confined filter chamber.

It will be understood that the foregoing description with the details of exemplary structure is not to be construed in any way to limit the invention, but that modifications may be made thereto without departing from the scope of the invention as set forth in the following claims.

We claim:

1. A filter apparatus for the separation of gas from suspended solid particles by filter bags including a housing with a filter chamber therein, said filter chamber having a first chamber into which particle laden gas is introduced, a second chamber from which cleaned gas is withdrawn after suspended solid particles have been removed by said filter bags, a releasable filter bag unit movable in and out of said filter chamber, said releasable filter bag unit including a gas impermeable filter bag support sheet forming a dividing wall between said first and second chambers, said sheet having a plurality of passages formed therein and a plurality of filter bags mounted thereon adjacent said passages and extending into said first chamber, and frame means supporting said sheet with the free ends said filter bags extending downwardly therefrom, and releasable sealing means on said housing aligned with said support sheet for securely holding said filter bag unit in said chamber and providing an airtight seal for said support sheet between said first and second chambers and wherein said housing has an inwardly extending shoulder about the interior thereof between said first and second chambers, said shoulder having a resilient sealing strip on the underside thereof; and wherein said support sheet has an upwardly extending peripheral flange adapted to engage said resilient sealing strip on said shoulder to provide a seal between said first and second chamber and wherein said housing has a pair of eccentric rods mounted internally thereon on opposite sides of the filter chamber, said rods being rotatable and positioned under said support sheet for pressing said support sheet into engagement with said sealing strip to hold said unit securely in place in the filter chamber, said rods being movable to an open position to release said support sheet and to form a guide for the underside of said support sheet for conveniently moving the unit out of the filter chamber and wherein said frame means has power driven lifting means thereon engaged with said support sheet for moving said support sheet into sealing engagement with said sealing strip and for engagement by said rods in the closed position.

* * * * *